United States Patent [19]

Carroll

[11] Patent Number: 5,367,448
[45] Date of Patent: Nov. 22, 1994

[54] THREE PHASE AC TO DC POWER CONVERTER

[76] Inventor: Lawrence B. Carroll, 629 Sunset Dr., Endwell, N.Y. 13760

[21] Appl. No.: 926,988

[22] Filed: Aug. 7, 1992

[51] Int. Cl.$^5$ ............... H02M 5/453; H02M 7/537; G05F 1/70
[52] U.S. Cl. ...................... 363/89; 363/17; 363/132; 323/207
[58] Field of Search ............ 323/207; 363/16, 17, 363/37, 39, 40, 41, 44, 45, 95, 97, 98, 79, 84, 87, 89, 131, 132, 127, 128; H02M 5/453, 7/537; G05F 1/70

[56] References Cited

U.S. PATENT DOCUMENTS

| | | | |
|---|---|---|---|
| 3,737,755 | 6/1973 | Calkin et al. | |
| 4,066,938 | 1/1978 | Turnball | 318/227 |
| 4,084,220 | 4/1978 | Akamatsu | 363/37 |
| 4,331,994 | 5/1982 | Wirth | 361/56 |
| 4,502,106 | 2/1985 | Glennos | 363/56 |
| 4,504,895 | 3/1985 | Steigerwald | 363/17 |
| 4,533,987 | 8/1985 | Tomofaji et al. | 363/36 |
| 4,567,555 | 1/1986 | Matsuse et al. | 363/138 |
| 4,638,418 | 1/1987 | Alexander | 363/49 |
| 4,672,520 | 6/1987 | Uede et al. | 363/37 |
| 4,675,802 | 6/1987 | Segimoto | 363/164 |
| 4,761,725 | 8/1988 | Henze | 363/46 |
| 4,805,082 | 2/1989 | Heinrich et al. | 363/37 X |
| 4,833,584 | 5/1989 | Divan | 363/37 |
| 4,866,592 | 9/1989 | Fujii | 363/98 |
| 4,885,675 | 12/1989 | Henze et al. | 363/26 |
| 5,019,952 | 5/1991 | Smolenski et al. | 363/16 |

OTHER PUBLICATIONS

State Of The Art PWM Techniques: A Critical Evaluation by M. Boost and P. Ziogas of Concordia University Quebeck Canada pp. 425–433.
A Conceptually New Approach For Regualted DC To DC Converters Employing Transistor Swithces And Pulsewidth Control IEEE vol. 1A–12 No: 4 Jul./Aug.
Recovery Circuit For Snubber Energy in Power Applications With High Switching Frequencies 1988 IEEE Johan C. Bendien, Heinz Van Der Broeck & G. Fregien.
Conference Record of the 1987 IEEE Industry App. Society Annual Meeting Part I pp. 680–684.
Three–Phase inductor Fed SMR Convertor With High Frequency Isolation, High PowerDensity and Improved Power Factor pp. 38–44.
A Three–Phase AC–to DC Power Transistor Converter–Controlled DC Motor Drive. 1987 IEEE pp. 848–853. Seshagiri R. Doradla.

Primary Examiner—Emanuel T. Voeltz

[57] ABSTRACT

A three phase AC to DC converter has an AC driven regulated current source, and it is provided with an unregulated current controller inverter. The zero crossing of the AC voltage input is monitored by a feedback control signal to a switching controller which is coupled to the current control switches of the regulated current source. In addition, the inverter is unregulated and current fed or controlled, and it is coupled to a high frequency current sensor in the preferred form of a current transformer, for sensing current flowing into the converter and which forms part of a control circuit for controlling the switching of the three phase AC regulated current source inputs for drawing currents. The unregulated current controlled inverter has an H bridge with series connected switches and a first diode (D1) and a second diode (D2) and a fifth switch (S12) in order not to dissipate energy. The first diode is series connected to the fifth switch and in series with the second diode, and the series combination is connected in parallel with the inverter legs. In addition, a recirculation inductor and the second diode are connected in parallel with the legs of the inverter, and the second diode is poled to permit circulating current in the recirculation inductor. A capacitor (C1), and the first diode are series connected, and the series combination connected in parallel with the first and second legs of the inverter. The diode (D1) is poled to provide current to the capacitor at the beginning of each inverter switching cycle. The fifth switch connected between the junction of the capacitor and the first diode and the junction between the second diode and second inductor permits discharging the capacitor without power dissipation during inverter operation.

10 Claims, 3 Drawing Sheets

CHOPPER SWITCH TIMING

THREE PHASE AC TO DC POWER CONVERTER

CROSS REFERENCE TO RELATED APPLICATIONS

The present application related to the following co-pending patent application: U.S. patent application Ser. No. 07/927,088, filed Aug. 7, 1992, by the same inventor, Lawrence B. Carroll, entitled "HIGH FREQUENCY ENERGY SAVING DC TO DC POWER CONVERTER". This co-pending application is filed concurrently therewith.

The co-pending application and the present application are owned by one and the same assignee, International Business Machines Corporation of Armonk, N.Y.

The description set forth in these co-pending application is hereby incorporated into the present application by this reference.

BACKGROUND OF THE INVENTION

This invention relates to AC to DC conversion. Power distribution from electrical utilities is provided in the form of three phase AC so that there is a continuous flow through the lines. In the world it has been recognized that it would be desirable to reduce the amount of energy required to provide electrical energy for our equipment. One of the goals to achieve this is to improve the power supply efficiency, and to achieve a power factor of one.

My invention arose from a need in a plan that would impose upon users the requirement that power supplies for computers achieve a high power efficiency and yet have low harmonic distortion on the utility line. High harmonic distortion is generally caused by many separate units drawing current not fully tracking the input harmonic, and this is a problem which is often caused by computers and will need to be overcome by some means or the other. How this can be efficiently achieved is a problem solved by the present invention.

As general background it is recognized that there are many patents in the art related to three phase AC to DC converters and there are also many inverters. General background patents include U.S. Pat. Nos. 4,805,082; 4,533,987; 4,672,520; 5,331,994; 4,567,555; 4,504,895; 4,833,584; 4,084,220; 4,638,418, 4,866,592; 4,502,106; 4,675,802; 4,761,725; and 4,885,675.

However, faced with the need to draw high power with low harmonic distortion on the line, typically in the past a costly technique would be chosen by those skilled in the art. These costly techniques historically have included the use of motor generator sets which run off the utility's line and provide the isolated DC voltage with a step up or step down from the utility's voltage. Others might employ a rectifier (AC to DC) feeding an inverter with a regulated output.

A three phase rectifier feeding an inverter which provides a stepped up or down voltage as an output could be used. Some such rectifiers could feed a capacitor, and have the capacitor connected to a regulated inverter.

There is a need for three phase AC to DC converters with sinusoidal input currents, which may be made with low weights and with a shod design cycle as required for a power supply design and which will have high reliability and high power density, and the above mentioned approach is not suitable.

U.S. Pat. No. 3,737,755 issued Jun. 5, 1985 describes a DC to DC converter with a DC driven regulated current source driving an unregulated converter. I have recognized that such a converter could be useful, but as described it fails to even suggest any applicability to the problem to be solved. In the related application I have described such a converter in more detail and then disclosed my invention for a DC to DC converter which saves energy by recirculation. There would be a similar need in AC applications.

Also in the prior art are publications. The IEEE Transactions on Industry Applications, Vol. 1A-12, No. 4, July/August 1976 contains the article by E. T. Calkin et al, entitled "A Conceptually New Approach for Regulated DC to DC Converters Employing Transistor Switches and Pulsewidth Control", pages 369-377. Our invention could be used with this topology, see page 375.

Recovery of energy in switching regulators is discussed in other applications, see IEEE Transactions on Power Electronics, Vol. 3, No. 1, January 1988, pp. 26-30. However, the use of some sod of energy recovery for current fed inverters is not suggested. What is now recognized as a need to be solved is the ability to provide a power source which draws a current with a very low harmonic content from a utility and which will be able to have a power factor of one, without risk of blow ups, hazards caused by electromagnetic fields, and additional expense which may be caused by other possible circuits which may achieve a similar result.

SUMMARY OF THE INVENTION

The improvements which I have made provides a basis for a short design cycle and provides a low weight, high power density converter. The new three phase AC to DC converter has an AC driven regulated current source, and it is provided with an unregulated current controller inverter. The zero crossing of the AC voltage input is monitored by a feedback control signal to a switching controller which is coupled to the current control switches of the regulated current source. In addition the inverter is unregulated and current fed or controlled, and it is coupled to a high frequency current sensor in the preferred form of a current transformer for sensing current flowing into the converter and which forms part of a control circuit for controlling the switching of the three phase AC regulated current source inputs for drawing sinusoidal input currents.

A three phase AC-DC power converter in accordance with one aspect of my invention has a three phase AC driven regulated current source input for drawing sinusoidal input currents, and a direct current output device, an unregulated current controlled inverter coupled between the three phase input and a direct current output device coupled to an isolating high frequency current sensor transformer for sending current flowing into said converter and controlling switching of the AC driven regulated current source input. The converter includes three pairs of regulated current source switches, having an "H" bridge configuration, and having a time overlap of between approximately 0.5 to 2.5 times the reverse recovery time of a rectifier diode of the inverter circuit.

Because of the large number of power supplies used in computer applications, the use of efficient power converters is important. Instead of dissipitating energy as in the past, a circuit has been provided which can be used such that a capacitor and an inductor are employed with a diode to permit the discharging of the capacitor to recirculate energy through a recirculation inductor so that the opening of a switch can reopen the energy stored in the inductor to pass the energy to a transformer with the use of a control diode. The invention disclosed in the co-pending application can be used in AC applications, and save energy. Thus the AC current fed inverter portion of the circuit can be provided in the form of a module which controls the switching of current though the inverter. Each switch of the inverter has an FET and a zener diode protection. In accordance with the invention the current fed inverter will have an inductor with current fed to the inductor. A series connected first diode and a capacitor will be connected in parallel with the legs of the inverter with the diode poled to provide current to the capacitor at the beginning of each inverter switching cycle as energy is passed from the circuit to an output transformer-rectifier circuit. A recirculation inductor and an additional diode are connected in parallel with the legs of the inverter, with the additional diode poled to recirculate current in the second inductor. Then a switch between the junction of the capacitor and first diode and also between the additional diode and recirculation inductor provides for discharging of the capacitor without power dissipation during the inverter operation instead of dissipating and losing the energy. Thus the recirculation is accomplished by few components to provide a lossless clamp circuit for recirculating the energy in the circuit from the capacitor back to the recirculation inductor. Thus, I have provided an unregulated current controlled inverter which has series connected inverter switches and a first diode (d1) and a second diode (d2) and a fifth switch (s12) in order not to dissipate energy, the first diode is series connected to the fifth switch and in series with the second diode, and the series combination is connected in parallel with the inverter legs. In addition, a recirculation inductor and the second diode are connected in parallel with legs of the inverter, and the second diode is poled to permit circulating current in the recirculation inductor. A capacitor (C1), and the first diode are series connected, and the series combination connected in parallel with said first and second legs of the inverter. The diode (D1) is poled to provide current to the capacitor at the beginning of each inverter switching cycle. The fifth switch between the junction of the capacitor and the first diode and the junction between the second diode and second inductor permits discharging the capacitor without power dissipation during inverter operation.

These and other improvements, illustrating the preferred embodiments approaches, are set forth in the following detailed description. For a better understanding of the inventions, together with advantages and features, reference may be had to the co-pending application for other developments we have made in the field. However, specifically as to the improvements, advantages and features described herein, reference will be made in the description which follows to the drawings.

BRIEF DESCRIPTION OF THE DRAWINGS

FIG. 1-B shows an alternative embodiment of my invention in the form of a three phase AC to DC power converter.

FIG. 1-C shows another alternative embodiment of my invention in the form of a three phase AC to DC power converter.

DETAILED DESCRIPTION OF THE INVENTION

Figure 2:
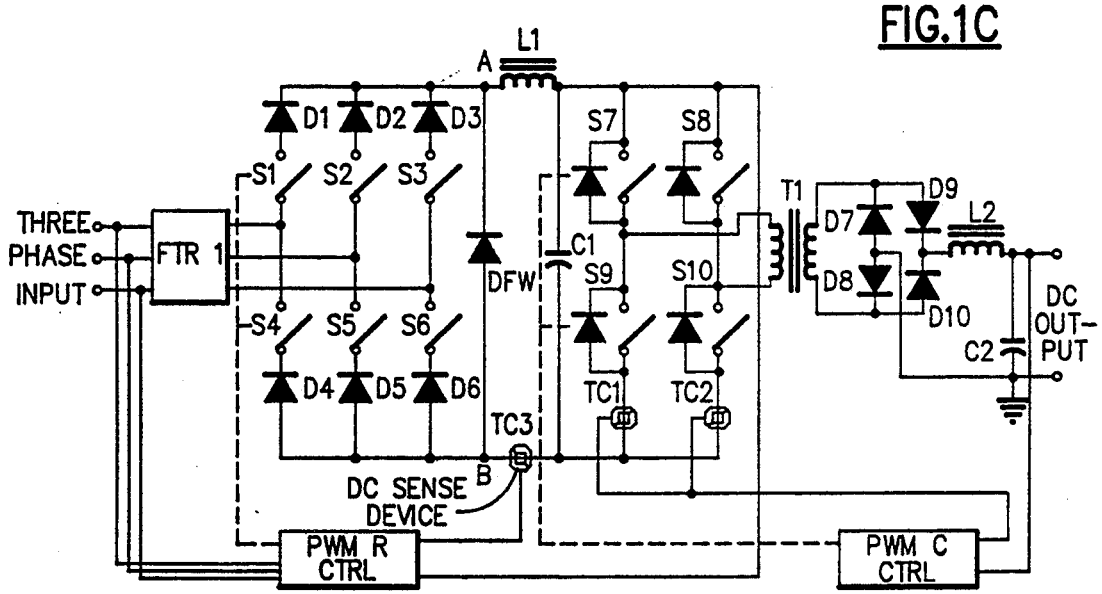
FIG. 2 shows a prior art voltage driven power converter.

Before considering our preferred embodiments in detail, it may be worthwhile to refer to FIG. 2 which describes a power converter of the kind illustrated by U.S. Pat. No. 3,737,755, issued Jun. 5, 1973. This device employs a DC to DC converter with a DC driven regulated current source driving an unregulated inverter. It is not recognized that such an unregulated inverter could be employed effectively in a circuit for drawing power from a three phase AC current source.

I have provided a pulse width modulated rectifier which allows the current being drawn to be shaped so that is sinusoidal. Then I have added a power transformer included in the unregulated inverter of the type shown by U.S. Pat. No. 3,737,755 as a current fed device for feeding the rectifier to convert the transformed AC back to the desired (stepped up or stepped down) DC.

I have added a single voltage control feedback loop and a single current feedback loop for controlling the sinusoidal current switches of the current source. The zero crossing information is provided by an input from each phase of the power source to the pulse width modulator controller, which controls the switching of the current switches of the AC to DC rectifier circuit.

Figure 1A:
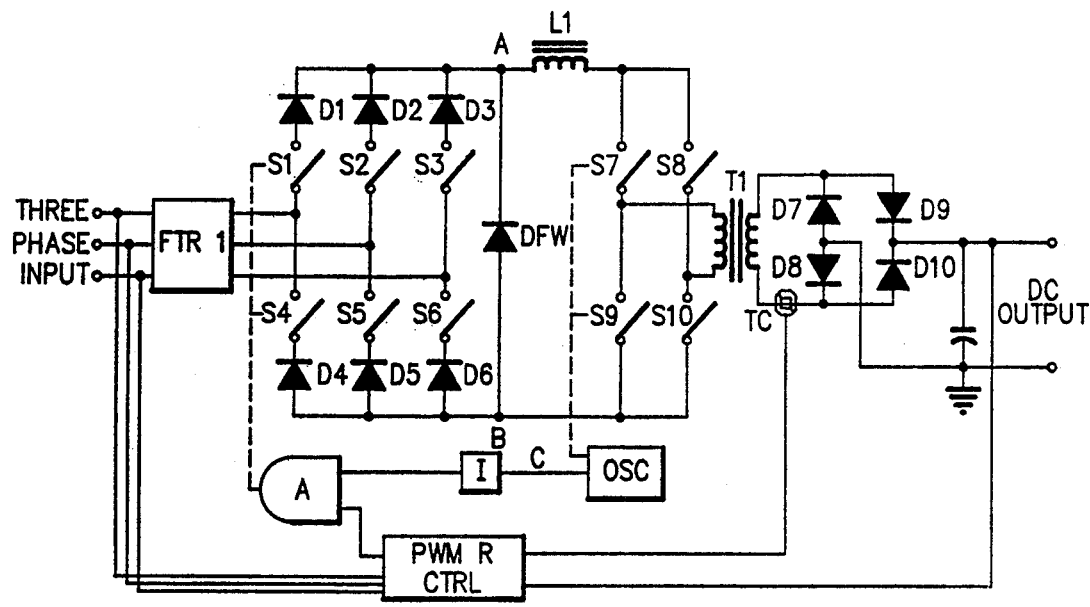
FIG. 1-A shows the preferred embodiment of my invention in the form of a three phase AC to DC power converter.
Figure 1B:
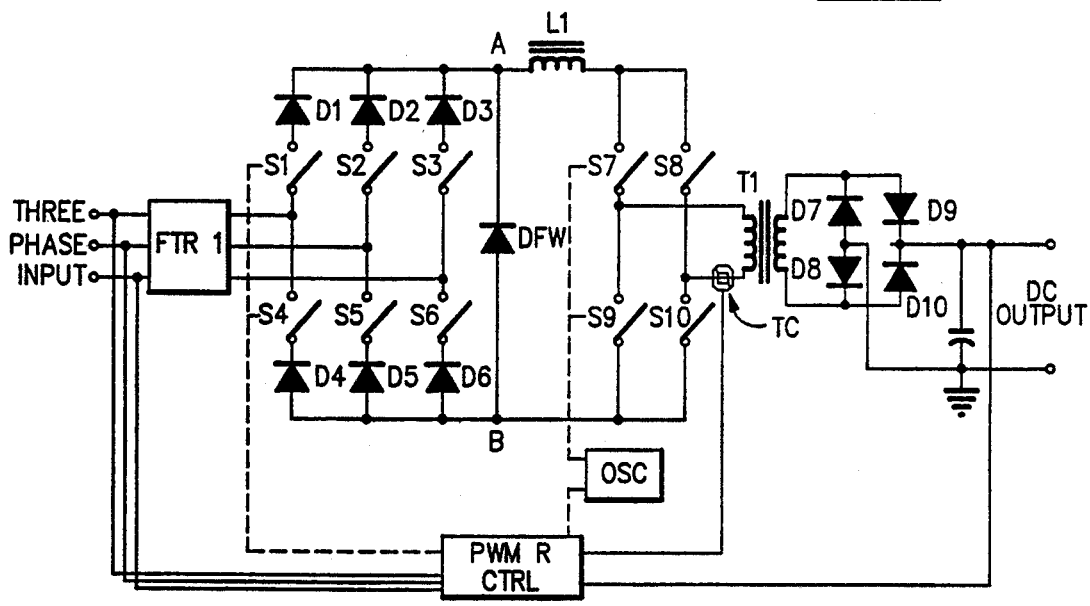
Figure 3:
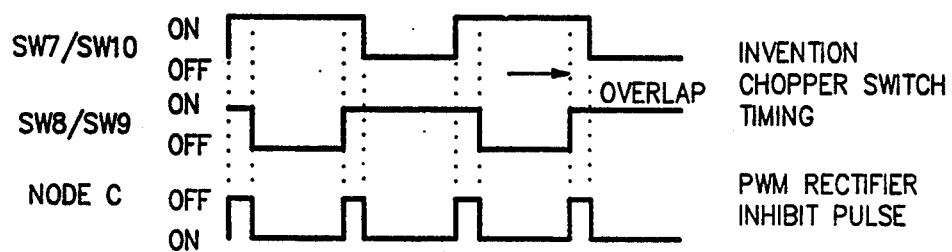
FIG. 3 shows my preferred chopper switch timing.
Figure 1C:
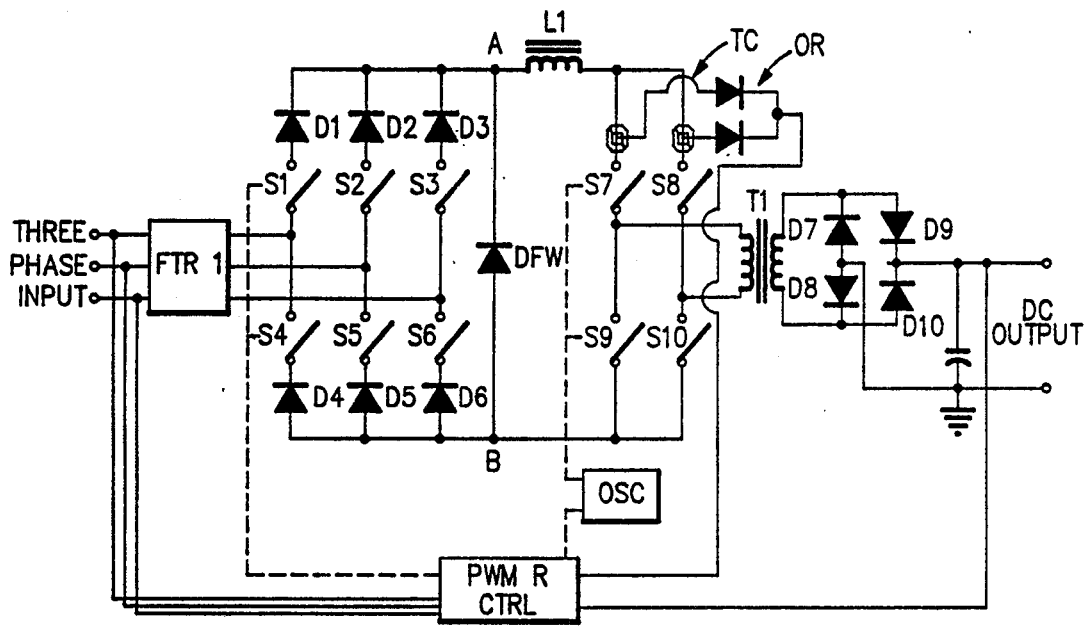

I have chosen a current sensor in the form of a high frequency current transformer, which is coupled for the current feedback loop either preferably to the secondary of the power transformer or, alternatively as show in FIG. 1-B to the primary. Now I could have chosen a Hall effect device as a current sensor, but that has a disadvantage of a drift control and other factors. Similarly, a resistor could have been employed, but that would have a cost of higher power usage. FIG. 1-C shows another alternative embodiment of my invention in the form of a three phase AC to DC power converter. The modification to FIG. 1-A is that the embodiment of FIG. 1-C employs current transformers TC for current sensing on the line for switches S7 and S8 and the output of the current transformers are ORed, with the diodes and dotted to the PWM R CTRL. Thus, except in the location of the current transformers FIGS. 1-A, 1-B and 1-C are identical, and they will generally be discussed as FIG. 1.

I employ a freewheeling oscillator to control switching of the inverter circuit. The inverter is thus completely unregulated, simplifying control circuitry, however the switches of the inverter remain protected since they all will never be open. There is always a small time when the conducting pairs of inverter switches overlap one another.

As a result of my improvements, power supplies with high wattage can be provided with current fed inverters, and power levels in the 16000 watt range can be provided while drawing sinusoidal current from the utility and providing an output that is isolated from the utility lines.

Turning now to our inventions in greater detail, it will be seen from FIG. 1 that my invention results from a change in the prior device and replacement of the DC-driven regulated current source with a three phase AC-driven regulated current source which draws sinusoidal input currents. The three phase power converter in accordance with my preferred embodiment uses an unregulated inverter but replaces the DC driven regulated current source with a three phase AC-driven regulated current source which draws sinusoidal AC input currents.

The result of the combination, which is illustrated in FIG. 1, is a three phase AC to DC converter with output isolation and sinusoidal input currents. The sinusoidal input currents allow the converter to have a near unity power factor and produce little, if any, high frequency line current harmonics.

In comparison to the circuit of FIG. 2, which also draws sinusoidal input currents, a regulated inverter powered by a three phase AC driven regulated voltage source, the circuit of FIG. 1 which is my preferred embodiment is far less complex, and yet with less complexity proves to be less stressful on components due to the current drive which is employed in the AC to DC converter.

In order to control converters of the type shown in FIG. 1 and FIG. 2 it is necessary to accurately sense the DC current flowing in the current source inductor L1. The preferred embodiment employs for this purpose a current transformer TC. The current sensing transformer TC can be preferably in the secondary of the power transformer T1, but it can be alternatively used in the primary without departing from the invention.

Figure 4:
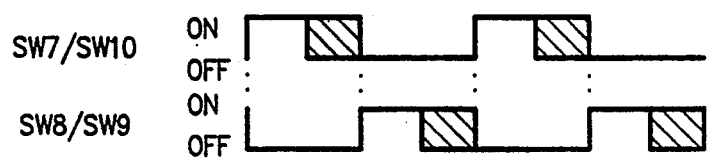
FIG. 4 shows the chopper switch timing which could be employed by the prior art device illustrated by FIG. 2.

Should a current transformer be employed by substitution in the circuit of FIG. 2, sensing of the inductor L1 current would not be as accurate due to the presence of the capacitor C1 required by the prior art and because of the varying pulse width of the inverter switches S7–S10 illustrated in the FIG. 4 which illustrates the prior art switch timing. Perhaps a substitution of a shunt or Hall effect device could be substituted into the prior art circuit, but these have limitations which are not present in the current transformer which is employed in the preferred embodiment of my invention.

In my preferred embodiment, the inverter switches S7–S10 of FIG. 1 always conduct current. This is guaranteed by providing a small amount of overlap between the conducting pair of switches S7 and S10 or S8 and S9. While there was an overlap in the prior patent, it was there indicated that the overlap should be long enough to allow the output diodes D7–D10 of FIG. 1 to reverse recover. However, I suggest that the overlap time should be adjusted such that the opening pair of switches openings when the diode reverse recover current reaches its peak or on the first of the following ringing peaks. As a result it will be found that the inverter device voltage stress is greatly reduced, and there is also achieved an efficiency improvement. In my preferred embodiment this is achieved by designing the overlap duration to be approximately 0.5 to 2.5 times the reverse recovery time (trr).

As the overlap time allows additional energy storage in inductor L1 and isolates current transformer TC from the inductor current. The control circuit, including the current transformer loop is isolated from line potential and dissipates no power. (An alternative is to use a resistor which would dissipate power.)

The switches S7–S10 are coupled to an independent square wave oscillator (OSC) which supplies timing pulses for inverter operation. The timing pulses cause S7–S10 will all be on for a brief amount of overlapped time as shown in FIG. 4 during normal operation, and so the alternating diagonal switches will not turn off until the next alternating pair of diagonal switches of S7–S10 turn on. The zero crossing input to the controller is provided by the line inputs, so that the current drawn follows the sinusoidal shape of the line. The oscillator timing is not a slave to the controller but is unregulated. It could however, if desired, also be coupled to the CTRL for synchronization, but this is not my preferred embodiment, only an alternative.

In my preferred embodiment all current source switches (S1–S6) are open during the overlap duration. As a result, inductor L1 current continues flowing through freewheeling diode, DFW, but does not increase. It will be noted that my current source switches (S1–S6) provide a function similar or the switching element 305 of U.S. Pat. No. 3,737,755.

The control of the current source switches in my preferred embodiment is provided by logic inverter "I" and logic "AND" gate "A" in FIG. 1. It will be recognized as shown that "A" represents six AND gates, one for each switch. Incidentally, generally in my preferred embodiment for switches I would employ N channel power MOSFETS. The frequency I am dealing with is the high frequency required for computer applications.

Further referring to FIG. 1, the regulated current source switches are modulated (opened and closed) by the control circuit PWM R CTRL. Each switch is modulated according to a sinusoidal function provided by the three input lines entering into the left of the PWM R CTRL block and modified by the voltage and current feedback lines entering into the right of the block. The PWM R CTRL control circuit is a control circuit which can be constructed by those skilled in the art.

The CTRL control circuitry, besides having a zero crossing input from the line, uses a single voltage loop and the current loop from sensor TC to regulate the DC output voltage by pulse width modulation. The single voltage control loop senses voltage by a lead coupling the DC output voltage to control the duration of current pulse switches S1–S6 via the power control circuit CTRL.

Current pulses provided by switches S1, S2, and S3 and freewheeling diode DFW, sum together at node A producing a constant current into inductor L1. This current flows into switches S7–S10 which direct it into the primary of the power transformer T1. When switches S7 and S10 close, the current flows through the primary of power transformer T1 in one direction and then onto the node B. When switches S8 and S9 close, the current thought the primary of T1 flows in the opposition direction and .then again on to node B. When all switches close (S7 and S10 don't open until S8 and S9 have closed for some overlap time, and vice versa), the current divides in half the flows straight through the inverter without going into power transformer T1. The current that was flowing in T1 prior to the closing of the next two switches gradually reduces to zero as T1's leakage inductance gives up its energy to the DC OUTPUT. The current through the inverter then flows on to node B. Upon leaving node B, the current splits into switches S4, S5, S6 and the freewheeling diode DFW. Since the current flowing out of each switch and those flowing into each switch is different in each leg (i.e. S1, S4, or S2, S5, or S3, S6) current pulses will flow in three lines connecting the input filter FRT1 to the switches. These pulses will be averaged by FTR1 into sinusoidal currents flowing in the input lines. Meanwhile, the alternating current flowing in the primary of T1 causes an alternating secondary current which is rectified by diodes D7–D10 producing the DC output voltage.

It will be noted that the development of the marriage between a three phase AC input rectifier and the unregulated inverter, as described, allows the stepping up or down of voltage, as well as obtaining voltage isolation between the three phase line input and the secondary output. The possible technique illustrated by FIG. 2 would take the DC current to a regulated DC voltage, and then use a DC regulated output with a capacitor. This does not solve the problem of harmonics adequately which is solved by the use of a current fed unregulated inverter or chopper.

The preferred embodiment is suitable for design of high wattage power converters.

DESCRIPTION OF PREFERRED EMBODIMENT FOR ENERGY SAVING INVERTER

One can avoid both the prior art zener diode dissipation and the alternative approach which was developed and described with respect to FIG. 2 of copending U.S. patent application Ser. No. 07/927,088, which also dissipates power. The solution may be thought of as a recirculating energy resource which permits discharging the capacitor C1 without power dissipation. The circuit for discharging C1 without power dissipation is shown in FIG. 5 which uses the illustrated inverter module and the current transformers of FIG. 1 to convert AC to DC.

Figure 5:
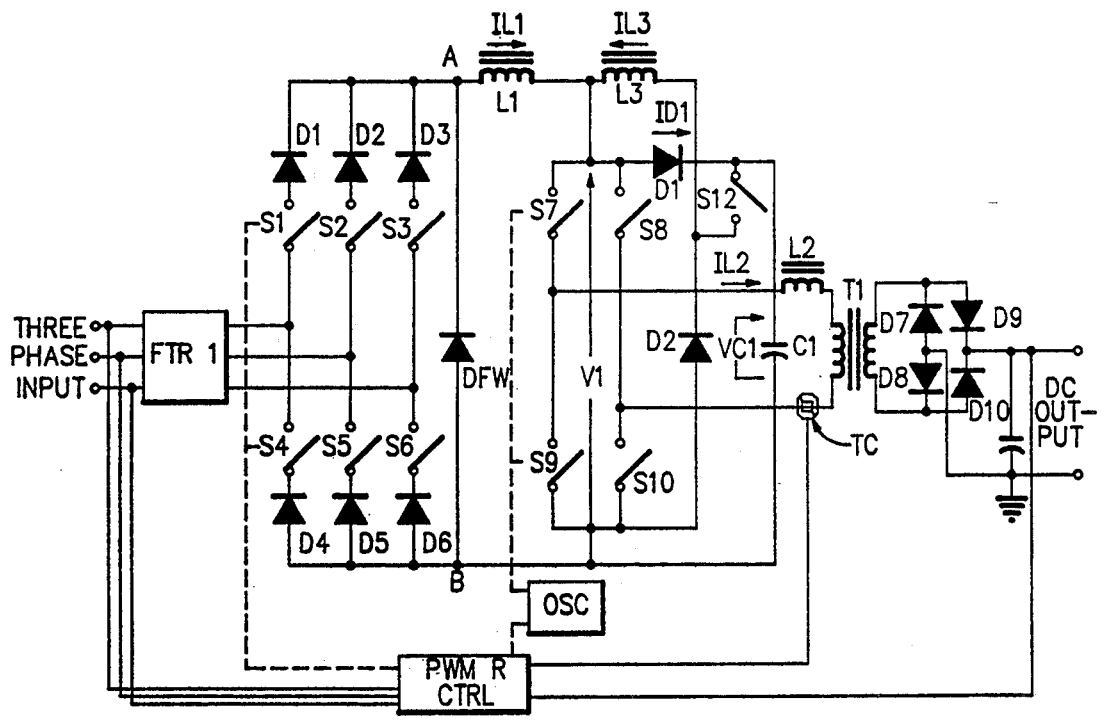
FIG. 5 shows schematically the preferred embodiment which provides for energy recirculation.

In FIG. 5 resistors R1 (or R2) of FIG. 2 of U.S. patent application Ser. No. 07/927,088, are replaced by the switch S12, a diode D2 and an inductor L3. The diode D2 is a free wheeling diode. Switch S12 closes at the beginning of each switching cycle causing current IL3 to flow as soon a current ID1 through diode D1 stops. Current IL3 flows in a controlled fashion depending on the capacitor voltage VC1 and source voltage V1. If switch S12 remains closed long enough for the capacitor's voltage VC1 to discharge to V1, the current IL3 will continue to circulate in inductor L3, diode D1 and switch S12. When switch S12 is opened, sometime before the end of the switching cycle, the current illustrated by IL3 will flow through diode D2 until inductor L3 has given up all its energy to the DC. The circuit is then ready for the next switching cycle.

Thus the current fed inverter which provides energy savings has a current fed inverter including a first leg having a first (S7) and second (S9) series connected switches and a second leg in parallel with the first leg having a third (S8) and a fourth (S10) series connected switches. A buck regulator provides a first inductor (L1) providing current to the inverter from a power source. The inverter itself has a series connected first diode (D1) and a capacitor (C1). The series combination is connected in parallel with the first and second legs of the inverter, and the first diode (D1) is poled to provide current to the capacitor at the beginning of each inverter switching cycle. In order to supply DC output a transformer (T1) having a primary and secondary is connected to a rectifier circuit. The rectifier output can be used to control the switching of the buck regulator. The primary of the transformer is connected to the junction of the inverter switches in the first and second legs of the inverter. A series connected second inductor (L3) and second diode (D2) are connected in parallel with the first and second legs of the inverter. The second diode is poled to permit circulating current in the second recirculation inductor L3. For this purpose a fifth switch (S12) is connected between the junction of the capacitor and the first diode, and the junction between the second diode and second inductor for discharging the capacitor without power dissipation during inverter operation.

A Module for a Current Fed Inverter

Figure 6:
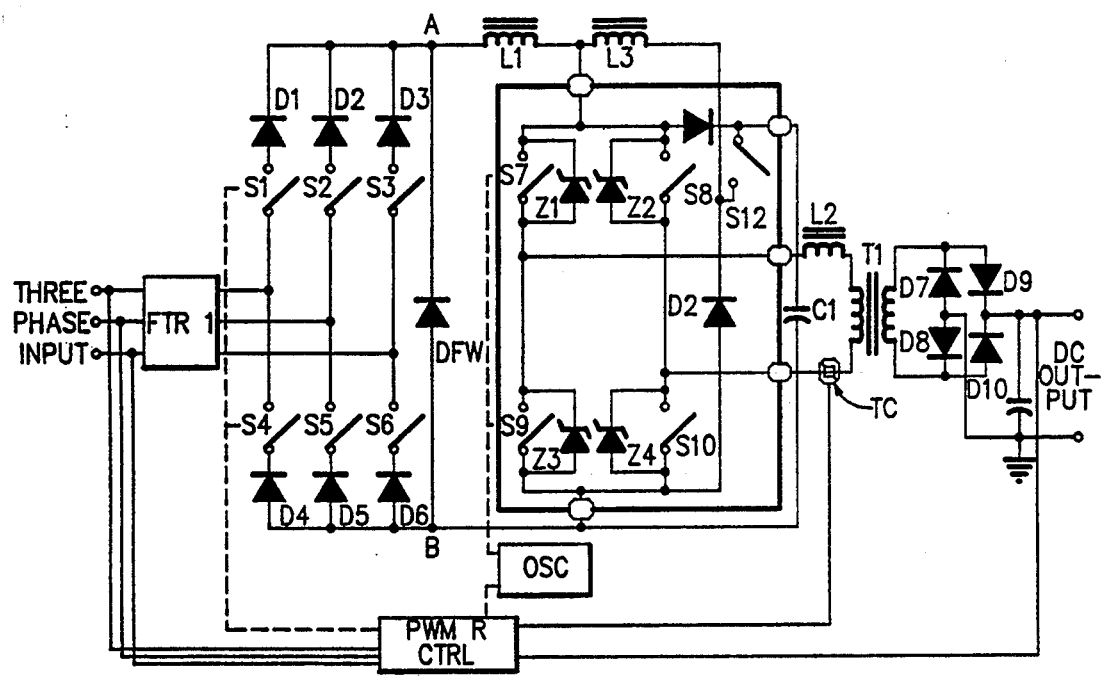
FIG. 6 shows the preferred inverter module.

S7, S8, S9, S10, S12, D1, and D2, in FIG. 5 are preferably packaged in a power hybrid module. As illustrated in FIG. 6, the module for a current fed inverter has a module circuit including a first leg having a first (S7) and second (S9) series connected switches and a second leg in parallel with the first leg having a third (S8) and a fourth (S10) series connected switches. The first diode (D1) and a second diode (D2) and a fifth switch (S12) are connected in the series combination shown. The first diode is series connected to the fifth switch and in series with said second diode, and the series combination is connected in parallel with the inverter legs. The first and second diodes are poled to carry current in opposite directions.

Using the module, the current fed inverter switch can be used for power recirculation by use as an element of the circuit in which the module is used. The capacitor (C1) is provided and the first diode and the capacitor are series connected, and the series combination connected in parallel with the first and second legs of the inverter. The diode (D1) is poled to provide current to the capacitor at the beginning of each inverter switching cycle. The diagrams of FIG. 5 are applicable also to FIG. 6.

It should be noted that in the principal circuit and in the one in which the module is an element of the high frequency (computer needed) current fed converter circuit, the capacitor (C1) is connected in series with the first diode, and there is a series connected recirculation inductor (L3), the series connected recirculation inductor (L3) and second diode (D2) is connected in parallel with the first and second legs of the inverter, the second diode poled to permit circulating current in the recirculation inductor. The fifth switch (S12) is connected between the junction of the capacitor and the first diode and the junction between said second diode and second inductor for discharging the capacitor without power dissipation during inverter operation.

The switches in the module are provided by switches formed by power FET's with appropriate gate resistors and protection zener diodes, where switches S7, S8, S9 and S10 of the inverter have the protection of zener diodes Z1–Z4, respectively.

The circuit described for a power converter can be used to for an AC circuits, as well as in a DC to DC power converter when the energy source is an AC source. In both applications the preferred embodiment saves energy and a recirculating energy resource by providing a lossless clamp which can be used with a current-fed inverter in high frequency applications. The technique is applicable to any current-fed "H" bridge circuit using pulse-width-modulation in boost mode or fixed duty cycle mode. For DC applications the complete current fed chopper allows a lossless clamp circuit to be provided in a hybrid module.

In both FIG. 5 and FIG. 6 the AC source to the inverter circuit is the same as shown and described with respect to FIG. 1 and TC can be similarly placed as shown in FIGS. 1-A, 1-B, 1-C.

APPLICATIONS

The invention can be used in a 16 KW power converter for computer systems. These systems are require a high frequency transformer and a fixed frequency inverter and the recirculating energy recovery circuit makes the systems much more energy efficient by utilization of the described clamp circuit shown in FIG. 5 and the same circuit in hybrid module from shown in FIG. 6 showing a hybrid module circuit design.

While the preferred embodiments of the invention have been described, it will be understood that those skilled in the art, both now and in the future, may make various improvements and enhancements which fall within the scope of the claims which follow. These claims should be construed to maintain the proper protection for the invention first disclosed.

What is claimed is:

1. A three phase AC-DC power converter for drawing sinusoidal input currents from a three phase power source comprising:
   an input filter;
   a three phase AC driven regulated current source coupled to said three phase power source through said input filter for drawing sinusoidal input currents, said regulated current source modulated according to the three phase line voltage of said three phase source to draw sinusoidal current;
   an unregulated current controlled inverter having an "H" bridge configuration of two pairs of switches coupled to the output of said three phase AC driven regulated current source, said inverter having during operation one or the other of two pairs of switches or both pairs of switches conducting at any one time;
   a transformer and output rectifier coupled to the output of the unregulated current controlled inverter for providing isolation and providing a DC output, conduction of one pair of said inverter switches providing current flow through said transformer in a first direction and conduction of the other pair of inverter switches providing current flow through said transformer in the opposite direction, said output rectifier comprising a plurality of output diodes, said unregulated inverter operated with overlap of conducting pairs of switches with the overlap time adjusted so that the opening pair of switches opens when the output diodes reverse recovery current reaches a peak.

2. A three phase AC-DC power converter according to claim 1 wherein the overlap time is adjusted so that the opening pair of inverter switches opens when the output diode reverse recovery current reaches its peak or on the first of the following ringing peaks, reducing inverter switch voltage stress.

3. A three phase AC-DC power converter according to claim 2 wherein the overlap time is approximately 0.5 to 2.5 times the reverse recovery time of the output diodes so that the opening pair of inverter switches opens when the output diode reverse recovery current reaches its peak or on the first of the following ringing peaks, reducing inverter switch voltage stress.

4. A three phase AC-DC power converter according to claim 1 wherein said unregulated current controlled inverter comprises:
   a first leg having a first (S7) and second (S9) series connected switches and a second leg in parallel with the first leg having a third (S8) and a fourth (S10) series connected switches;
   a first diode (D1) and a second diode (D2) and a fifth switch (S12), said first diode being series connected to said fifth switch and in series with said second diode, and the series combination connected in parallel with the inverter legs, said first and second diodes poled to carry current in opposite directions;
   a capacitor (C10), said capacitor and first diode being series connected, with the series combination connected in parallel with said first and second legs of the inverter, said diode (D1) poled to provide current to said capacitor at the beginning of each inverter switching cycle; and a recirculation inductor (L3), the recirculation inductor and second diode connected in series with said second diode (D2), the series combination connected in parallel with said first and second legs of the inverter, said second diode poled to permit circulating current in said recirculation inductor, said fifth switch connected between the junction of said capacitor and said first diode and the junction of said second diode and said second inductor for discharging the capacitor without power dissipation during inverter operation.

5. A three phase AC-DC power converter according to claim 1 wherein said three phase AC driven current source comprises:
   a three phase switching bridge rectifier;
   a freewheeling diode connected across the output of the three phase switching bridge rectifier; and
   an inductor providing in series with the output of the three phase switching bridge rectifier for providing current to the unregulated inverter.

6. A three phase AC-DC power converter according to claim 5 wherein said three phase switching bridge rectifier and unregulated inverter have pairs of switches switched at the same fixed frequency.

7. A three phase AC-DC power converter according to claim 1 wherein said rectifier comprises a plurality of diodes forming a full wave rectifier and wherein the transformer has a secondary winding which provides energy to the full wave rectifier.

8. A three phase AC-DC power converter according to claim 1 wherein wherein a high frequency current sensor current sensor Tc is coupled to the primary of the of the inverter transformer T1.

9. A three phase AC-DC power converter according to claim 1 wherein wherein a high frequency current sensor current sensor Tc is coupled to the secondary of the of the inverter transformer T1.

10. A three phase AC-DC power converter according to claim 1 wherein wherein two ORed together current sensors Tc are coupled to sense the current passing from the inductor to the inverter to give the same signal results as a single transformer.

* * * * *